(12) United States Patent
Alvarez Merino et al.

(10) Patent No.: US 10,520,341 B2
(45) Date of Patent: Dec. 31, 2019

(54) INSTRUMENT FOR MEASURING AIR SPEED BY MEANS OF PARABOLIC MOVEMENT AND MEASURING METHOD

(71) Applicant: UNIVERSIDAD PERUANA DE CIENCIAS APLICADAS S.A.C., Lima (PE)

(72) Inventors: José Carlos Daniel Alvarez Merino, Lima (PE); Adrian Eduardo Palomo Alvarez, Lima (PE)

(73) Assignee: UNIVERSIDAD PERUANA DE CIENCIAS APLICADAS S.A.C., Lima (PE)

( * ) Notice: Subject to any disclaimer, the term of this patent is extended or adjusted under 35 U.S.C. 154(b) by 11 days.

(21) Appl. No.: 15/575,784

(22) PCT Filed: Oct. 11, 2016

(86) PCT No.: PCT/PE2016/000018
§ 371 (c)(1),
(2) Date: Nov. 20, 2017

(87) PCT Pub. No.: WO2017/078549
PCT Pub. Date: May 11, 2017

(65) Prior Publication Data
US 2018/0245954 A1 Aug. 30, 2018

(30) Foreign Application Priority Data
Oct. 14, 2015 (PE) ........................ 002147-2015/DIN

(51) Int. Cl.
*G01F 1/05* (2006.01)
(52) U.S. Cl.
CPC .................................. *G01F 1/05* (2013.01)

(58) Field of Classification Search
CPC ... G01F 1/05; G01F 1/74; G01F 1/704; G01F 1/7086; G01F 1/002; G01F 1/20; G01P 5/18
(Continued)

(56) References Cited

U.S. PATENT DOCUMENTS

| 2,665,583 | A | * | 1/1954 | Anjanos | ................. | G01P 13/02 |
| | | | | | | 73/170.15 |
| 3,595,078 | A | * | 7/1971 | Beck | ...................... | G01F 1/704 |
| | | | | | | 73/861.04 |

(Continued)

OTHER PUBLICATIONS

Written Opinion of the International Searching Authority of application PCT/PE2016/00018, dated Jun. 2, 2017.*

*Primary Examiner* — Nimeshkumar D Patel
*Assistant Examiner* — Jean F Morello
(74) *Attorney, Agent, or Firm* — Caldwell Intellectual Propert

(57) ABSTRACT

The invention relates to an instrument for measuring air speed by means of parabolic movement and to a measuring method, wherein the measuring instrument is formed by a cubic structure (1) that holds a screwable, flexible container (2) which releases—where air speed needs to be measured—a drop of liquid, the drop falling on one of the concentric circles located on an interchangeable plate (3) that is positioned on a flat base (4) of the device and perpendicular to the axial end of the outlet for the drop of liquid. Depending—on the height—the movement with which the drop falls, the air speed can be determined by means of the horizontal range of the parabolic movement followed by the drop of liquid, and evaluated using the distance between the point of impact of the drop on the surface with respect to the center. The direction of the air speed can also be determined from angle formed by the projection of the vertical plane above which projection the (Continued)

ISOMETRIC VIEW air moves in relation to the x-axis of the x-y plane located above the interchangeable plate (3).

6 Claims, 1 Drawing Sheet

(58) Field of Classification Search
USPC .................................................. 73/272 R
See application file for complete search history.

(56) References Cited

U.S. PATENT DOCUMENTS

| | | | | |
|---|---|---|---|---|
| 5,153,665 A | * | 10/1992 | Weinstein | G01F 1/708 356/28 |
| 2009/0217751 A1 | * | 9/2009 | Onishi | A63B 57/00 73/170.01 |

* cited by examiner

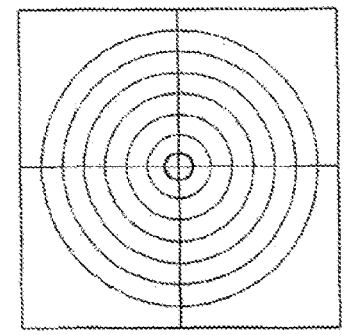
Fig. 3 TOP VIEW
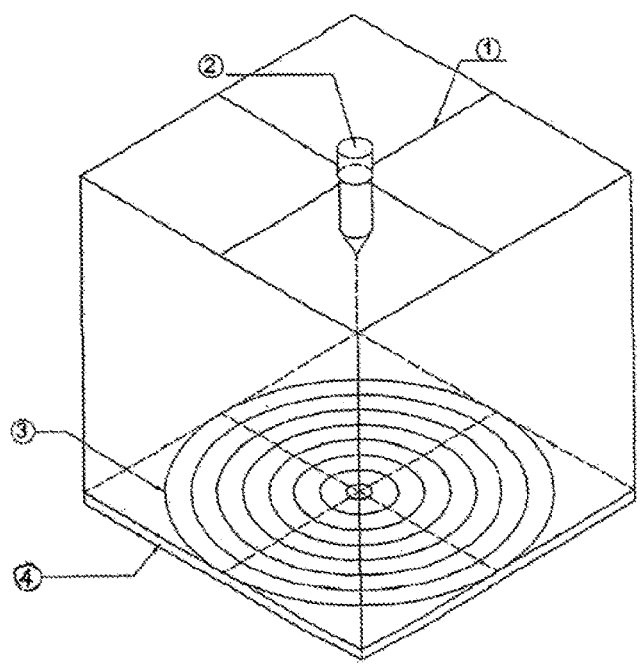
Fig. 1 ISOMETRIC VIEW
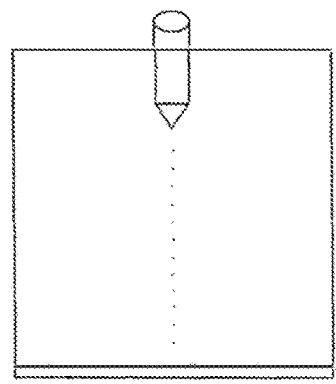
Fig. 2 FRONTAL VIEW
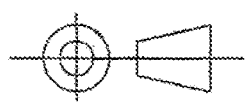

INSTRUMENT FOR MEASURING AIR SPEED BY MEANS OF PARABOLIC MOVEMENT AND MEASURING METHOD

RELATED APPLICATION DATA

This application represents a national stage application corresponding to PCT application Ser. No. PCT/PE2016/000018, filed on Oct. 11, 2016, which claims priority to Peruvian national patent application 002147-2015/DIN, filed on Oct. 14, 2015 and entitled "MEDIDOR DE LA VELOCIDAD DEL AIRE POR MOVIMIENTO PARABOLICO Y PROCEDIMIENTO DE MEDICION."

TECHNICAL FIELD

The present invention generally relates to the field of instruments and measurement procedures of air velocity for applications in air conditioning, ventilation and indoor air quality. In particular, the present invention is related to the instruments and measurement procedures of air velocity at low speeds between 1 m/s and 5 m/s.

BACKGROUND

As currently practiced, a typical technique for measuring air velocity "can be determined using a Pitot tube—with electronic output, or using a sensor of thermal dispersion—with electronic output" (US 20030205094 A1).

Regarding the measurement using Pitot tube, Klopfenstein Jr. (1998) states that: "If the Pitot tube is properly designed and the density of air passing through the Pitot tube is known, the velocity of air passing through the Pitot tube can be calculated using a standard formula".

For example, the U.S. Pat. No. 6,711,959 B2 "Air velocity measurement instrument" consists of a Pitot tube, parallel and centered to a line adapter, and a static pressure tube. The pressure difference between the extremes of the Pitot tube and the static pressure tube represents the measure of the speed of airflow in the instrument body. This patent is oriented to measure the air velocity in places (subsystems) requiring a particular range for the speed of the airflow.

Another technical background of the invention would be a measuring air velocity device with nozzle that "includes two chambers separated by a flow nozzle. There is an entrance to the chamber upstream to the nozzle. The air handling subsystem is attached to the chamber downstream to the nozzle so that air entering the subsystem passes first through the upstream chamber, then to the nozzle, and finally to the downstream chamber before entering the subsystem. The nozzle presents an obstruction to the flow which causes a pressure difference around the obstruction. The static pressure is measured on either side of the nozzle and the measurement is calibrated to correlate the difference of static pressure with speed airflow . . . flow nozzle meters are accurate and effective for measuring flow rates. However, due to its large size, the air management subsystem must be outside."

Sensors of thermal dispersion are another technology used for measurement of the air velocity. Specifically, and as described in the site www.tecnicasandinas.com, the thermal dispersion technology places two temperature RTD platinum thermowell protected sensors in the process line. One RTD is activated while the other senses the actual process temperature. The temperature difference between them is measured, which is directly proportional to the mass flow rate of the fluid." The measurement of air velocity by thermal dispersion sensors directly and proportionately relates air velocity with the temperature difference.

As an alternative measurement method, U.S. Pat. No. 2,665,583 describes a thrust anemometer, which comprises a body in the form of a tetrahedron with three studs, a pivoting member which has its pivot point at the apex; the pivoting member further has an upper free end with a spherical element exposed to air currents, while its lower free end moves over a concave element with concentric circular traces, whereby it is achieved to indicate the air velocity in each circle when being deflected the pivoting member due to the drag force over the spherical body. This effect is reflected in each circumference by a light signal.

Other methods for measurement of wind velocity, are found in the use of anemometers, such as anemometers having four cups for example, where the four cups appear equidistant on a plane perpendicular to an axis where four supports of these same converge. Upon rotation, the number of turns of the axis is proportional to the wind speed. The relationship between wind speed and the cups speed is known as "anemometer factor".

These existing techniques have several disadvantages. None is useful to measure the direction as well as the magnitude of the velocity. The Pitot tube methods principally only function with high wind-speeds, as does the use of the thrust anemometer, which must experience at minimum sufficient wind strength to impel the physical components to move. Many of these solutions also function only for measuring fluid flow in particular contexts, such as the flow of fluid within ducts, or for measurement of moderate to high wind speeds outdoors. These existing techniques have several disadvantages. None is useful to measure the direction as well as the magnitude of the velocity. The Pitot tube methods principally only function with high wind-speeds, as does the use of the thrust anemometer, which must experience at minimum sufficient wind strength to impel the physical components to move. Many of these solutions also function only for measuring fluid flow in particular contexts, such as the flow of fluid within ducts, or for measurement of moderate to high wind speeds outdoors.

The correlation between air velocity in the deviation of liquid particles can be perceived when the wind blows near a pool of water orienting water flow in a certain direction. This correlation was also reported in the document "Agricultural Tailgate Safety Training" where textually it is said that "strong winds can cause large droplets (during irrigation) to deviate from the required site." However, although they perceive the effect, there is no precedent where it is used for measuring air velocity.

SUMMARY OF THE DISCLOSURE

In one aspect, an instrument for measuring air velocity is disclosed. The instrument includes a cubic structure, including an upper plane and a base plane. The instrument includes a dropper and flexible container centered vertically in the upper plane of the cubic structure, the dropper and flexible container filled with a colored liquid. The instrument includes an interchangeable plate with concentric circumferences, each concentric circumference of the concentric circumferences representing a different air velocity than each other concentric circumference of the concentric circumferences, and a flat base, the interchangeable plate resting on the base plane. When a drop of the colored liquid drops from the dropper and flexible container, the drop acquires air stream velocity of air passing through the cubic structure, follows a parabolic trajectory determined by the air stream velocity and lands at a point of incidence on the interchangeable plate.

In another aspect, a method of air velocity measurement by parabolic movement includes dropping a liquid drop through an air stream onto an interchangeable plate over a flat plane, and measuring the air velocity of the air stream by determining a distance reached on the interchangeable plate by the liquid drop.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is an isometric view of the air velocity measurement instrument by parabolic movement with its main elements: cubic structure [1], dropper and flexible container [2], interchangeable plate [3] with concentric circles, and flat base [4].

FIG. 2 represents a front view of the air velocity measurement instrument by parabolic movement.

FIG. 3 is a plant view of the air velocity measurement instrument by parabolic movement in which the interchangeable plate [3] with concentric circles radially distributed is illustrated, and in which a structure of cubic form [1] is observed which holds in the center of its upper plane a dropper and flexible container [2], which has an axial end.

DETAILED DESCRIPTION

In an embodiment, as illustrated in FIGS. 1-3, an instrument for measurement the velocity of the air through parabolic movement is illustrated. The measurement instrument includes a cubic structure [1] that holds a dropper and flexible container [2] which drops a liquid drop, where measurement of air velocity is desired, which impinges on one of a plurality of concentric circumferences located on an interchangeable plate [3]. The interchangeable plate is over a flat base [4] of the device and perpendicular to the axial outlet end of the dropper.

As the movement followed by the drop of liquid is a function of the height, the air velocity may be determined using the horizontal range of the parabolic movement that is followed by the drop of liquid, and evaluated by the distance between the drop impact point on the surface from the center of the concentric circumferences, which may be circular as shown for instance in FIGS. 1-3. Air velocity direction may also be determined from an angle formed by a projection of a vertical plane through which the drop travels with respect to an x axis of an x-y plane which is located over the interchangeable plate [3].

The invention includes a cubic structure [1] having a superior or upper plane plane and a base plane. Cubic structure [1] holds in the center of its superior plane a dropper and flexible container, as described further below. Cubic structure [1] may be placed in the place where the air velocity measurement is required.

Dropper and flexible container [2] is held in the center of the upper plane of cubic structure [1]. Dropper and flexible container [2] is filled with a colorful liquid fluid.—which when pressed manually or mechanically drops a colorful liquid drop which exits its axial conical end. The disposition of the dropper and flexible container [2] is perpendicular to the airflow whose velocity requires to be measured; for instance, the dropper and flexible container [2] may be positioned to measure the air velocity at the outlet of an air conditioning. As a result, the air velocity is perpendicular to the free fall vertical component of the colorful liquid. Dropper and flexible container [2] may be spin-on or screwable.

Drop of colorful liquid may be dropped by manual or mechanical drive. Drop of colorful liquid is oriented and directed by action of the air, falling over the surface of the interchangeable plate [3] at an angular direction and reaching a given radial position on the surface of the interchangeable plate [3].

In the x-y plane, interchangeable plate [3] is located. Interchangeable plate [3] may be constructed of absorbent material. Interchangeable plate [3] includes multiple concentric circumferences, each having a radial distance from a common center. Each radial distance represents a magnitude of air velocity, determined via the arrival point after the parabolic movement followed by the colorful fluid drop.

Alternatively, this action may be carried out by electronic means using an alternative plate with fluid contact sensors and through a digital reading. In other words, another embodiment is the same cubic structure [1] but adapting the circular interchangeable plate [3] including superficial sensors to measure digitally and directly the position of the incident liquid drop on the said interchangeable plate [3].

In operation, as the colorful fluid drop falls, the air velocity vector impinges on the colorful fluid drop, inducing the colorful fluid drop to follow a parabolic trajectory in a plane perpendicular to the interchangeable plate [3] and the flat base [4]. As a result, the concentric interchangeable plate [3] may be removed and read the magnitude of the air velocity may be read on the interchangeable plate [3]. Air speed may be valuated as marked by the observation, over one of the concentric circumferences, of a colorful point where the fluid drop has impacted. The air velocity is a function of the traveled space, as the gravity and the height of the cubic structure [1] would be pre-defined.

Similarly, the as well as the direction of the air velocity may be read on the removed interchangeable plate [3]. The perpendicular plane which contains the trajectory of the moving drop, when orienting in relation to the coordinate axis x (E,O); and (N,S), and z (vertical), determines the direction of the air velocity.

The system and method described above confer several distinct advantages. On the other hand, above-described system, in contrast to existing systems for air-speed measurement, lacks mechanical elements, such as elements that when actuated acquire a deflected position which actuate a light signal which determines the direction and magnitude of the air velocity in an interchangeable plate [3] of concentric circles. Although such a method involves the use of concentric circles, the measuring principle is completely different, not making use of fluid parabolic movement that the air velocity produces in a falling liquid drop.

The above-described device and method further represents an improvement over existing art because it provides a simpler measurement of the air velocity than all previous mentioned in the background. In addition, the above-described device is portable and possesses a modular nature allowing it to be transported and handled easily. In contrast to measurement techniques using a Pitot tube via the Bernoulli principle, which are limited mainly to measuring air speed in ducts and pipes, the present invention is oriented to measuring speeds, in rooms and chambers. Furthermore, as the invention disclosed herein uses the principle of the parabolic movement that integrates vertical and horizontal velocities in one that follows a parabolic trajectory, it is possible to measure both direction and speed in a single measurement. In addition, the lack of moving parts means that there is little inertia to overcome; about the only requirement to obtain a reading is incorporation of the fluid drop into the air stream to determine its speed and directionality.

The invention claimed is:

1. An instrument for measuring air velocity using parabolic movement, the instrument comprising:
   a cubic structure including an upper plane and a base plane;
   a dropper and flexible container centered vertically in the upper plane of the cubic structure,
      the dropper and flexible container filled with a colored liquid; and
   an interchangeable plate with concentric circumferences, each concentric circumference of the concentric circumferences representing a different air velocity than each other concentric circumference of the concentric circumferences, and a flat base, the interchangeable plate resting on the base plane;
   whereby, when a drop of the colored liquid drops from the dropper and flexible container, the drop acquires air stream velocity of air passing through the cubic structure, follows a parabolic trajectory determined by the air stream velocity and lands at a point of incidence on the interchangeable plate.

2. The air velocity measurement instrument of claim 1, wherein the interchangeable plate is of an absorbent material.

3. The air velocity measurement instrument of claim 1, wherein the interchangeable plate further comprises a sensor connected to a display that detects the point of incidence.

4. A method of air velocity measurement by parabolic movement using the instrument of claim 1, the method comprising:
   dropping a liquid drop through an air stream onto the interchangeable plate over a flat plane; and
   measuring the air velocity of the air stream by determining a distance reached on the interchangeable plate by the liquid drop.

5. The method of claim 4, wherein measuring the distance further comprises measuring the distance reached by the liquid drop in a horizontal plane over the interchangeable plate.

6. The method of claim 4, wherein measuring the air velocity further comprises determining a direction of air velocity by determining an angle formed in a vertical plane containing the liquid drop parabolic trajectory and the interchangeable plate.

* * * * *